United States Patent
D'Souza et al.

(10) Patent No.: US 12,407,240 B2
(45) Date of Patent: Sep. 2, 2025

(54) SENSING INDUCTOR-CURRENT IN A SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

( * ) Notice: Subject to any disclaimer, the term of this patent is extended or adjusted under 35 U.S.C. 154(b) by 218 days.

(21) Appl. No.: 18/363,765

(22) Filed: Aug. 2, 2023

(65) Prior Publication Data
US 2024/0128870 A1   Apr. 18, 2024

(30) Foreign Application Priority Data

Oct. 14, 2022 (IN) .............................. 202241058870

(51) Int. Cl.
*H02M 1/00* (2007.01)
*H02M 3/158* (2006.01)

(52) U.S. Cl.
CPC ....... *H02M 1/0009* (2021.05); *H02M 3/1584* (2013.01); *H02M 3/1588* (2013.01)

(58) Field of Classification Search
CPC . H02M 1/0009; H02M 3/1584; H02M 3/1588
See application file for complete search history.

(56) References Cited

U.S. PATENT DOCUMENTS

| | | | |
|---|---|---|---|
| 8,541,995 B2 | 9/2013 | Tang et al. | |
| 10,063,146 B1 | 8/2018 | Lee | |
| 10,270,342 B2 | 4/2019 | Pullen et al. | |
| (Continued) | | | |

FOREIGN PATENT DOCUMENTS

CN    105576974 A    5/2016

OTHER PUBLICATIONS

C. Francis Yiu, A Gain-Reconfigurable Current-Sensing circuit for High-Frequency Low-Power Dc-Dc Converters, https://tspace.library.utoronto.ca/bitstream/1807/24290/6/Yiu_ChunChee_Francis_20103_MASc_thesis.pdf, Apr. 7, 2010, 95 Pages.

(Continued)

*Primary Examiner* — Jue Zhang
(74) *Attorney, Agent, or Firm* — IPHORIZONS PLLC; Narendra Reddy Thappeta

(57) ABSTRACT

In a switching converter employing a high-side switch and a low-side switch that are alternately ON in a first phase and a second phase of a switching cycle respectively, inductor-current flowing through the high-side switch is sensed with a first scaling factor to obtain a scaled high-side current. Inductor-current flowing through the low-side switch is sensed with a second scaling factor in the second phase to obtain a scaled low-side current. Both of the scaled high-side current and the scaled low-side current are examined for any discontinuity during transition from the high-side phase to the low-side phase. In case of discontinuity, one or both of the first factor and the second factor is/are adjusted to reduce the magnitude of the discontinuity between the scaled high-side current and the scaled low-side current during transition from the first phase to the second phase. An accurate scaled copy of the inductor-current is obtained.

20 Claims, 9 Drawing Sheets

(56) References Cited

U.S. PATENT DOCUMENTS

| | | | |
|---|---|---|---|
| 11,223,272 B2 | 1/2022 | Hasan | |
| 2004/0008016 A1 | 1/2004 | Sutardja et al. | |
| 2006/0044843 A1 | 3/2006 | Oswald et al. | |
| 2007/0229050 A1 | 10/2007 | Shigeta et al. | |
| 2010/0264895 A1* | 10/2010 | Weng | H02M 3/1588 323/285 |
| 2010/0277142 A1 | 11/2010 | Tan et al. | |
| 2014/0169049 A1* | 6/2014 | Chandrasekaran | H02M 3/1584 363/84 |
| 2015/0261248 A1 | 9/2015 | Sambucco | |
| 2015/0280558 A1* | 10/2015 | Lopata | H02M 3/1588 323/271 |
| 2016/0359320 A1 | 12/2016 | Bisogno | |
| 2021/0159795 A1* | 5/2021 | Lin | H02M 3/158 |

OTHER PUBLICATIONS

High-Side SmartFETs with Analog Current Sense-AND9733/D, https://www.onsemi.com/pub/collateral/and9733-d.pdf, Dec. 2021, 50 pages.

Cheung Fai Lee, A monolithic current-mode Cmos DC-DC converter with on-chip current-sensing technique, IEEE Journal of Solid-State Circuits, Jan. 2004, 13 Pages, vol. 39, No. 1, IEEE.

Shreyas Dmello, High Accuracy Current Sense of Smart High Side Switches, https://www.ti.com/lit/an/slvae08/slvae08.pdf?ts=1671435508432, Nov. 2019, 11 pages.

High-Side, High Current Sensing Techniques, https://www.renesas.com/us/en/document/apn/an1827-high-side-high-current-sensing-techniques, Feb. 7, 2022, 7 Pages.

Jung-Woo Ha, et al., A Fast Response Integrated Current-Sensing Circuit for Peak-Current-Mode Buck Regulator, Journal of Semiconductor Technology and Science, Dec. 2014, 8 pages, , vol. 14, No. 6.

Yu-Huei Lee, et al., Fast Transient (FT) Technique With Adaptive Phase Margin (APM) for Current Mode DC-DC Buck Converters, IEEE Transactions on Very Large Scale Integration (VLSI) Systems, Oct. 2012, pp. 1781-1793, vol. 20, No. 10.

Yasuhiro Sugimoto, et al.,Feedback Loop Analysis and Optimized Compensation Slope of the Current-Mode Buck DC-DC Converter in DCM, IEEE Transactions on Circuits and Systems, Jan. 2015, pp. 311-319, vol. 62, No. 1.

H. Pooya Forghani-Zadeh, et al., A Lossless, Accurate, Self-Calibrating Current-Sensing Technique for DC-DC Converters, 31st Annual Conference of IEEE Industrial Electronics Society, 2005. IECON 2005, Date of Conference: Nov. 6-10, 2005, 6 pages, IEEE.

Hylas Y. H. Lam, et al., Loop Gain Analysis and Development of High-Speed High-Accuracy Current Sensors for Switching Converters, 2004 IEEE International Symposium on Circuits and Systems (ISCAS), Date of Conference: May 23-26, 2004, 5 pages, IEEE.

Chin Chang, Lossless Current Sensing and Its Application in Current Mode Control, 2008 IEEE Power Electronics Specialists Conference, Date of Conference: Jun. 15-19, 2008, 6 pages, IEEE.

Bob Mammano, Current Sensing Solutions for Power Supply Designers, Power Supply Design Seminar, SEM-1200, Texas Instruments SLUP114, Jan. 1997, 37 pages.

Behnam Sedighi , et al., Variable gain current mirror for high-speed applications, pp. 277-281 Apr. 25, 2007, pp. 277-281, IEICE Electronics Express, vol. 4 Issue 8.

\* cited by examiner

SENSING INDUCTOR-CURRENT IN A SWITCHING CONVERTER

PRIORITY CLAIM

The instant patent application is related to and claims priority from the co-pending provisional India patent application entitled, "High Side Current Sense", Serial No.: 202241058870, Filed: 14 Oct. 2022, which is incorporated in its entirety herewith to the extent not inconsistent with the description herein.

BACKGROUND

Technical Field

Embodiments of the present disclosure relate generally to power supply circuits, and more specifically to sensing inductor-current in a switching converter.

Related Art

Switching converter refers to a component which generates a regulated DC (direct current) voltage from an input supply voltage by employing one or more switches, as is well known in the relevant arts. Typically, a switching converter transforms the input supply voltage into a pulsed voltage by operating switch(es), the pulsed voltage then being smoothed using capacitors, inductors, and other elements to generate the regulated DC voltage. Switching converters are used in components such as regulated power supplies (e.g., in multi-phase voltage regulator modules or VRM), which in turn are used in devices such as computers, and mobile phones, as is also well known in the relevant arts.

A switching converter often contains a pair of switches driving an inductor. Each switch is typically implemented as a transistor (e.g., MOSFET) and the switches are connected in series between input supply voltage and a reference terminal (e.g., ground). The switch coupled closer to the input voltage (source of input power to the converter) is termed as the high-side switch, while the other one is termed as a low-side switch. The switches are operated by a control circuit which switches on the transistors in successive (and ideally) non-overlapping time durations to cause the switch that is currently ON to drive the inductor in the corresponding duration.

The operations of the high-side switch and the low-side switch cause a current (inductor-current) to flow through the inductor to the output voltage node via a filter. Typically, the inductor-current increases in the durations when the high-side switch is ON and decreases in the intervals in the duration in which the low-side switch is ON.

The inductor-current value (including sign/polarity, magnitude and waveform/shape) is often required in switching converters for determining and/or enabling other operations. Some examples of such operations include utilizing the inductor-current value in voltage-regulation feedback loop(s) using current-mode control, load-current limiting, ensuring stability of the feedback loop, etc. As another example, when a switching converter is part of a multi-phase voltage regulator module (VRM), the inductor-current value is additionally utilized to manage load-sharing between the various phases/power-stages of a switching converter in the VRM.

Therefore, sensing circuits are employed in a switching regulator to obtain an estimate of the inductor-current value, specifically by generating a copy (scaled or otherwise) of the inductor-current and to provide the copy to the corresponding circuitry that require the inductor-current value (or inductor-current information, in general). However, several factors may cause the inductor-current copy/estimate to have inaccuracies.

Several aspects of the present disclosure are directed to sensing inductor-current accurately in a switching converter.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Aspects of the present disclosure are directed to sensing inductor-current flowing through an inductor driven by a combination of a high-side switch and a low-side switch in a switching converter. The high-side switch and the low-side switch respectively drive the inductor in a first phase and a second phase periodically.

Inductor-current flowing through the high-side switch is sensed with a first scaling factor in the first phase to obtain a scaled high-side current. Inductor-current flowing through the low-side switch is sensed with a second scaling factor in the second phase to obtain a scaled low-side current. Both of the scaled high-side current and the scaled low-side current are examined for any discontinuity during transition from the first phase to the second phase. high-side current and scaled low-side current. In case of discontinuity, one or both of the first factor and the second factor is/are adjusted to reduce the magnitude of the discontinuity between the scaled high-side current and the scaled low-side current during transition from the first phase to the second phase. As a result, an accurate scaled copy of the actual inductor-current is obtained.

In an embodiment, the second scaling factor is trimmed once at the time of post-fabrication testing and is not adjusted thereafter. The first scaling factor is then adjusted using a closed-loop scheme instead of being trimmed. In the embodiment, the closed-loop scheme is operative continuously to adjust the first scaling factor during the entire operation of the switching converter.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
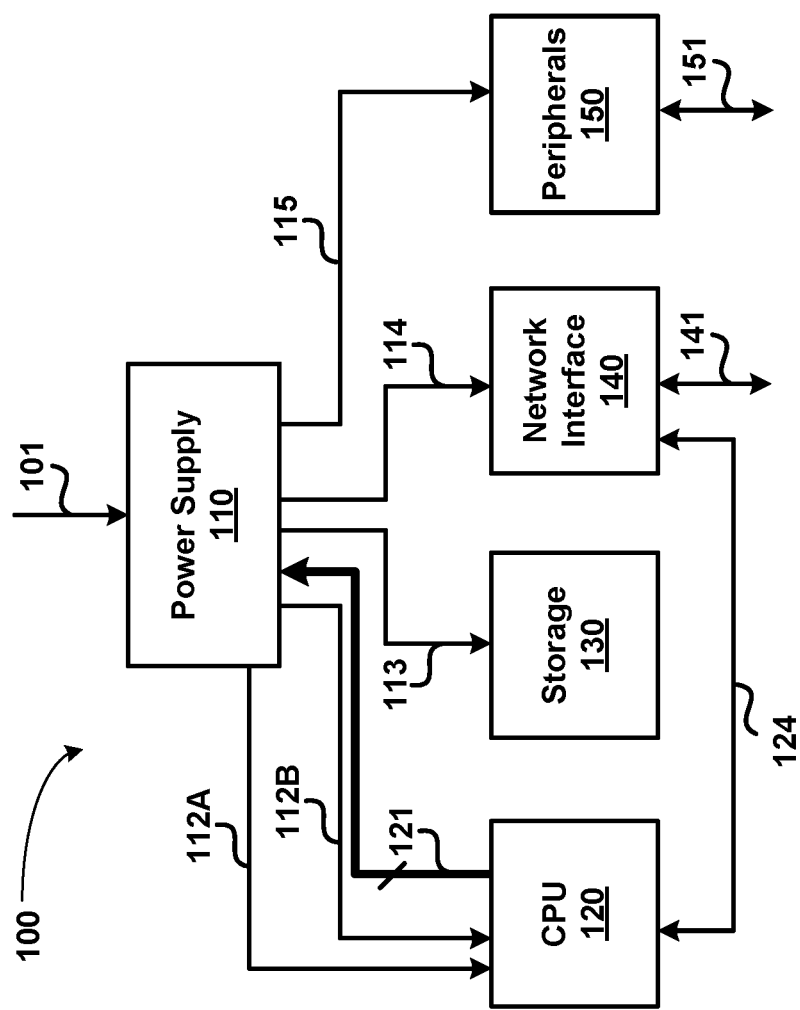
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1A CPU 120, in general, represents a processor or a system-on-chip (SoC), and is shown as receiving a pair of supply voltages on respective paths 112A and 112B from power supply 110. As an example, voltage 112A may be a smaller voltage than 112B, and may be used to power a core portion of CPU which may include arithmetic logic unit (ALU), microprogram sequencer, registers, etc. Voltage 112B may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provided two-way communication between system 100 and a computer network, or in general internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 receives from/transmit to external systems and CPU 120 respectively on path 141 and path 124.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to control the multi-phase converters to reduce/increase current output based on the specific signal (e.g., PS1, PS2 and PS3).

In the embodiment, power supply 110 is a trans-inductor voltage regulator module (TLVR), and contains one or more step-down switching (buck) converters to generate several smaller voltages from a higher-voltage supply source. In other embodiments however, other types of DC-DC converters such as boost, buck-boost, hysteretic converters etc., can be implemented instead of a buck converter. With a TLVR containing several switching converters, multiple devices/ICs requiring different supply voltages can be mounted on the same platform, for example, a computer motherboard of a personal computer (PC). Accordingly, the description is continued with respect to a TLVR as shown in FIG. 2A.

3. Voltage Regulator Module

Figure 2A:
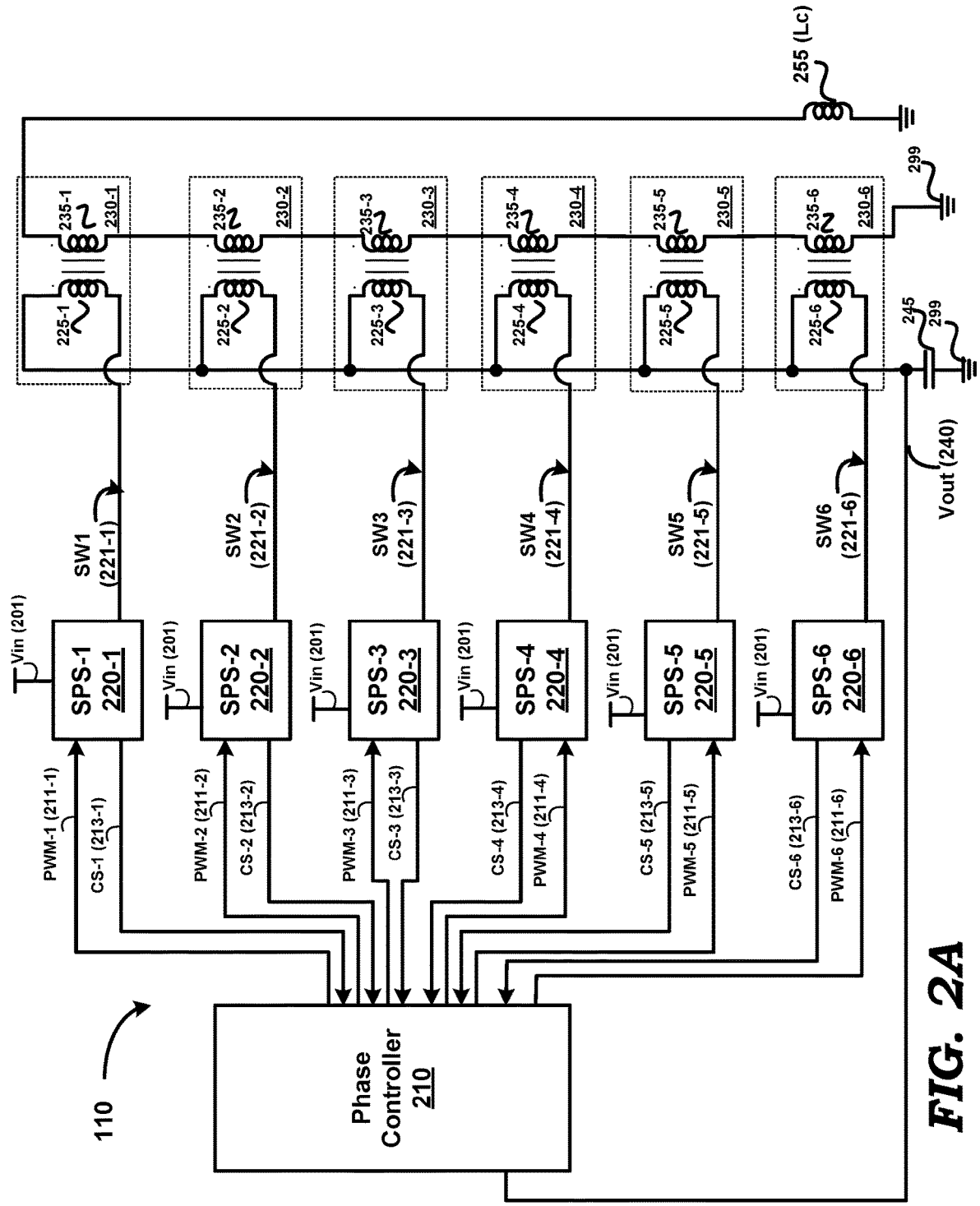
FIG. 2A is a block diagram illustrating the details of a voltage regulator module (VRM) in an embodiment of the present disclosure.

FIG. 2A is a block diagram illustrating the details of a Trans-inductor Voltage Regulator module (TLVR) in an embodiment of the present disclosure. Power supply 110 is shown implemented as a TLVR and is shown containing phase controller 210, smart power stages (SPS) SPS-1 (220-1) through SPS-6 (220-6), transformers 230-1 through 230-6, compensation inductor (Lc) 255 and capacitor 245. The combination of SPS-1 through SPS-6, the respective transformer and phase controller generates a regulated output voltage Vout on output node 240, which may correspond for example to supply node/path 112A of FIG. 1. Although not shown in the interest of conciseness and clarity, TLVR 110 may contain other sets of SPSes along with corresponding transformers which together with phase controller 210 can generate other supply voltages, such as those on paths 112B, 113, 114 and 15 of FIG. 1. In FIG. 2A, power supply voltage Vout (240) is shown generated by a 6-phase TLVR (there are six SPSes—220-1 through 220-6).

Phase controller 210 performs regulating functions to enable the generation of regulated voltage Vout (240). Accordingly, Vout (240) is shown as being provided as input to phase controller 210, to enable operation of one or more feedback loops operated by phase controller 210 to regulate Vout (240). Phase controller 210 also receives inductor-current information (current flowing through each of the inductors) from each of the SPSes to enable various operations such as current-mode control of voltage regulation loop, current limiting, short circuit protection, and balancing/load sharing of the load current by the SPSes.

The combination of (corresponding circuitry within) phase controller 210, an SPS, and the corresponding transformer forms one "phase" of each multi-phase TLVR. Thus, for example, SPS-1, transformer 230-1, and the corresponding portion within phase controller 210 represent one phase of the 6-phase TLVR. It is noted here that, while each transformer is shown as a separate component (e.g., 230-1), a single larger module containing multiple transformers can instead be used.

Each SPS may be implemented to contain a high-side switch, a low-side switch, gate-drive circuitry for the two switches, current-sense block and other circuits (not shown). An example of such 'other circuits' includes, but is not limited to, a temperature-monitor circuit to measure temperature of the SPS and to provide the temperature to phase controller 210. The current-sense block of an SPS measures/senses and/or estimates the magnitude of inductor-current through the inductor of that phase, and provides such inductor-current information to phase-controller 210.

Each SPS receives a source of power as an input which is connected to the high-side switch (shown in detail in sections below). In FIG. 2, the supply source is numbered 201, and has a voltage Vin. In an embodiment, the magnitude of Vin is about 21 volts (V), although other magnitudes are possible in other embodiments. Each SPS may also receive bias voltage Vcc (not shown) provided by a voltage regulator (not shown, but which may be within phase controller and separate from the switching regulators and SPSes of FIG. 2) or from a source external to the TLVR.

Each SPS communicates with phase controller 210 via corresponding signals such as PWM and CS. Thus, SPS-1 is shown connected to phase controller 210 through signal/paths PWM-1 (211-1) and CS-1 (213-1). SPS-6 communicates with phase controller 210 via signals PWM-6 (211-6) and CS-6 (213-6). The other SPSes would have similar connections with phase controller 210. Only those signals as relevant to the understanding of the disclosure are depicted in FIG. 2. There may be other communication signals between phase controller 210 and SPSes 220, such as a TMP signal (an output from an SPS to phase controller 210, providing information regarding the temperature in the SPS), a SYNC signal (input to an SPS and may be used by phase controller 210 for the purposes of waking-up the SPS upon power-up of the power supply 110, and also to indicate the power-mode (e.g., PS2, PS3)), etc. The signals PWM-1 through PWM-6 are jointly referred to generally as PWM signals for conciseness and clarity.

Signal PWM is an input to an SPS and is a pulse-width modulated (PWM) signal. Signal PWM is a fixed-frequency, variable duty-cycle signal, although its frequency is potentially modifiable by phase controller 210 based on various operating considerations such as load-current demands. Thus, a PFM (pulse-frequency modulated) signal, or a signal that can change between PFM and PWM modes, can be employed instead of PWM signals in some other embodiments.

A cycle/period of signal PWM consists of a first interval in which only the high-side (HS) switch of SPS is ON, and a second interval in which only the low-side (LS) switch of the SPS is ON. The PWM signal (or more typically, drive signals derived from the PWM signal) controls the opening and closing of high-side switch and low-side switch of the SPS. The duty cycle of the PWM signal is set by phase controller 210 and is designed to generate the desired power supply voltage and/or control/change the current supplied by that phase. For example, PWM-1 would have a duty cycle as required for the magnitude of Vout (240) and the current to be provided by SPS-1.

As is well known in the relevant arts, the PWM signals to each SPS of a same multi-phase voltage regulator may be staggered, i.e., delayed with respect to each other in phase such that typically no two high-side switches (and possibly low-side switches also) in the converter (i.e., respective SPSes) are ON in overlapping intervals. Such a technique is employed for reasons such as, for example, to ensure that the peak instantaneous current drawing from Vin is relatively low at all times. However, the ON times of the high-side switches (as well as the low-side switches) do not need to be overlapping, but can also be partially or fully overlapping.

Each PWM signal is an input from phase controller 210 to a corresponding SPS. A transition from logic LOW to logic HIGH of a PWM signal causes the corresponding SPS to switch ON its high-side switch and switch OFF its low-side switch. A transition from logic HIGH to logic LOW level of the PWM signal causes the SPS to switch OFF its high-side switch and switch ON its low-side switch. A high-impedance (hi-Z) value on signal PWM causes the SPS to turn OFF both of its high-side and the low-side switches.

Signal CS (current sense) is an input to phase controller 210 from an SPS, and contains information regarding the magnitude of the inductor-current of that phase/SPS. The information can be in the form of a current, voltage, digital values, etc. CS may be designed to be scaled down version (for example by a factor 'k') of the actual inductor-current. The factor 'k' may be pre-determined at design, and is therefore available to phase controller 210.

Each SPS is coupled to a respective transformer 230 having a primary winding 225 and a secondary winding 235. Thus, SPS-1 (220-1) is shown coupled to transformer 230-1 having primary winding 225-1 and secondary winding 235-1. Primary winding 225 of each transformer is shown connected between 'switching node' SW (221) (the junction of the high-side switch and the low-side switch) of the corresponding SPS and output node 240 (Vout). The secondary windings of transformers of all SPSes and compensation inductor 255 are connected in series between ground (GND) terminations/connections.

The series connection of secondary windings of the transformers enables faster transient response to changes in load current, as is well known in the relevant arts. The primary and secondary winding of each transformer are tightly coupled (with a coupling coefficient of close to unity). The primary to secondary turns ratio is typically 1:1 (or higher). Compensation inductor Lc (255) is designed such that an optimal trade-off between transient performance and loop stability of the TLVR is achieved, as is also well known in the relevant arts.

During operation, current flowing through the primary winding of a transformer of an SPS induces an emf, and therefore, a current in the corresponding secondary winding. The induced current in turn flows through secondary windings of transformers of the other SPSes as well as the compensation inductor due to the series connection noted above.

Figure 2B:
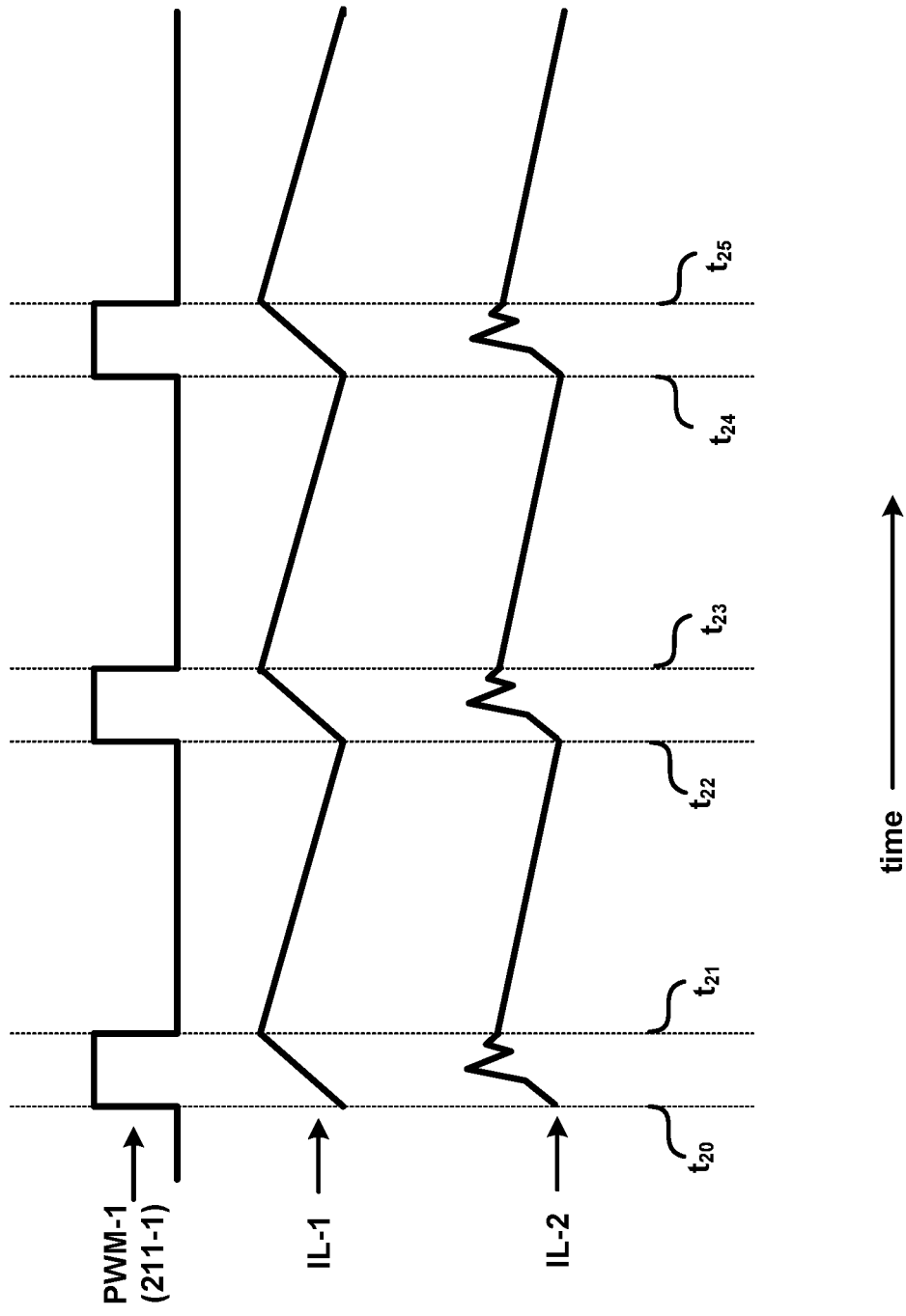
FIG. 2B is a diagram illustrating example waveforms of a pulse-width modulated (PWM) signal provided to a smart power stage (SPS) and the inductor-current.

FIG. 2B illustrates a PWM signal input to an SPS and two example inductor-current waveform. The example is provided with reference to SPS-1. PWM-1 is shown as being at logic high level in time intervals t20-t21, t22-t23 and t24-t25, and logic low level in intervals t21-t22 and t23-t24. Intervals in which PWM-1 is a logic high may be viewed as a 'first phase', and intervals in which PWM-1 is a logic low may be viewed as a 'second phase'. The first and second phases repeat, as may be observed from FIG. 2B. The high-side switch and the low-side switch may be viewed as respectively 'driving' the inductor in each of the first phases and second phases. It is noted that the terms 'first phase' and 'second phase' are not to be confused with the phases of a multi-phase converter (as noted above).

IL-1 and IL-2 are example waveforms of the inductor-current through primary winding 225-1. The specific shapes of the waveforms are shown to be simple merely to illustrate the phases of operation of the SPS. Actual inductor-current waveforms may be much more complex than that shown in FIG. 2B, as is well known in the relevant arts. The waveform shown for IL-1 assumes only very little or no impact on the inductor-current due to the current in the secondary windings, and thus resembles the inductor-current waveform in the inductor of a standalone buck converter. IL-1 increases in logic-HIGH intervals of PWM-1 and decreases in logic-LOW intervals of PWM-1. IL-2 is an example waveform for the inductor-current that illustrates the effect of coupling via the respective windings of the transformers in logic-HIGH intervals of PWM-1. The waveform of IL-2 is shown as linearly decreasing in logic-LOW intervals of PWM-1. In general, the inductor-current waveform in logic-HIGH intervals of the PWM signal is not a straight line, but has a more complex shape, due to the transformer connections.

Referring again to FIG. 2A, SPS-1 provides on node (CS-1 213-1) a copy of the inductor-current flowing through inductor 225-1. CS-1 can be a replica current, voltage or digital values (assuming SPS-1 has the circuitry to generate such digital values), as examples. In an embodiment of the present disclosure, CS-1 is a current and may be a scaled replica of the inductor-current. The other SPSes may also have similar waveforms at the corresponding connections to phase controller 210.

SPS-1 generates the copy of the inductor-current by sensing the actual inductor-current in one of many known ways. In an embodiment, described in detail below, SPS-1 contains a pair of sense circuits, with one sense circuit to measure/sense the voltage-drop across the high-side switch as the inductor-current flows through the high-side switch (i.e., during the 'first phase') and the other sense circuit to measure/sense the voltage drop across the low-side switch as the inductor-current flows through the low-side switch (i.e., during the 'second phase'). The two voltage measurements are then converted to form corresponding 'portions' of the copy of the inductor-current that are combined to form the copy of the inductor-current provided by SPS-1 on path 213-1 (CS-1).

The implementation details of SPS-1 and the manner in which SPS-1 generates a copy of the inductor-current are described next with examples.

4. Smart Power Stage (SPS) and Generation of Inductor-Current Copy

Figure 3:
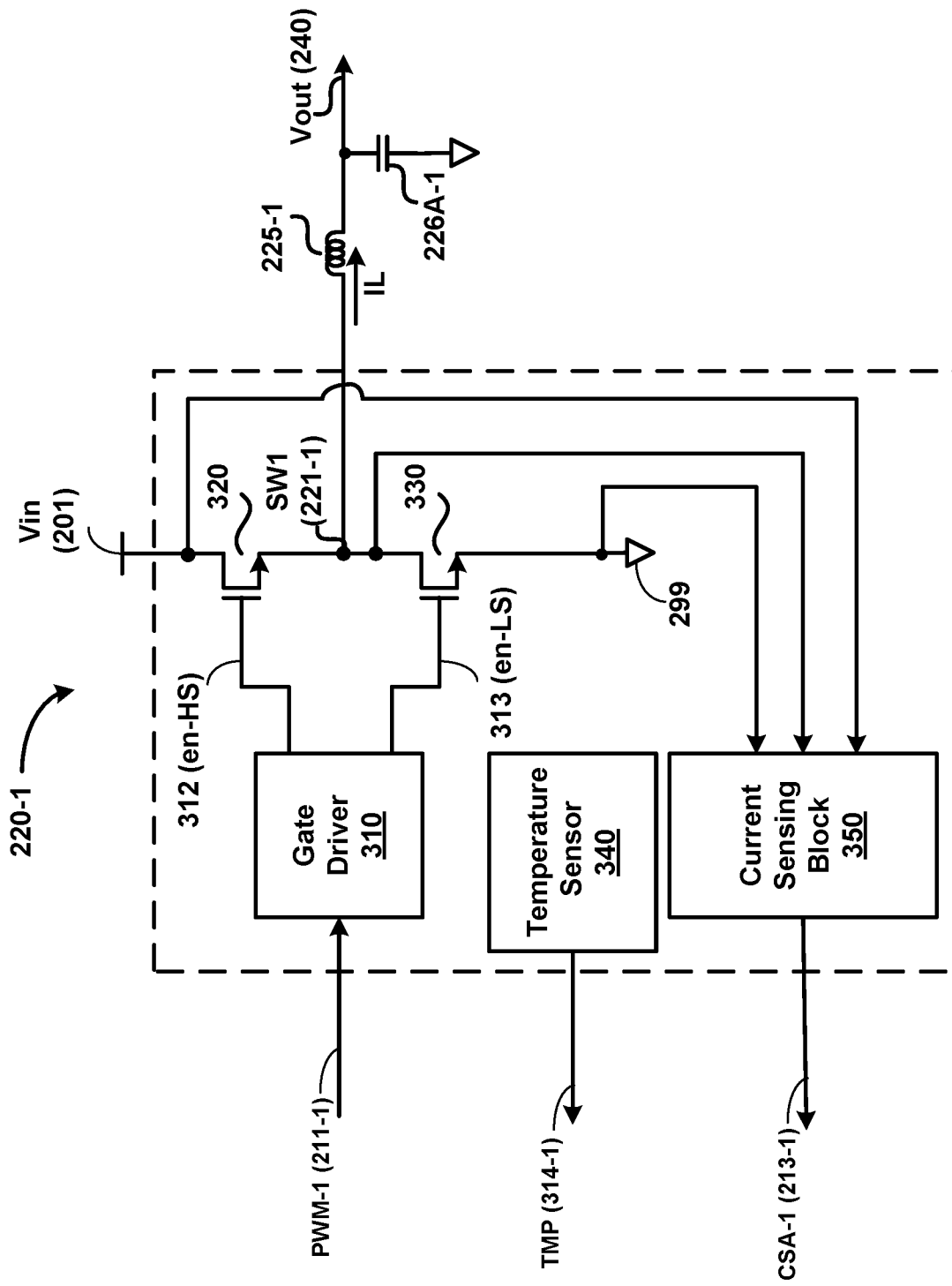
FIG. 3 is a diagram illustrating the implementation of an SPS in an embodiment of the present disclosure.

FIG. 3 is a diagram illustrating the implementation of an SPS in an embodiment of the present disclosure. SPSA-1 (220-1) is shown in detail in FIG. 3. The other SPSes can also be implemented to be similar to SPSA-1. SPSA-1 is shown containing gate driver 310, high-side (HS) switch 320, low-side (LS) switch 330, temperature sensor 340 and current sensing block 350. Also shown in FIG. 3 are inductor 225-1 and capacitor 226A-1. Node 240 provides the supply voltage Vout. It is noted that the specific implementation details of SPSA-1 are provided merely by way of illustration. However, in other embodiments, an SPS can have more or fewer blocks.

Temperature sensor 340 measures the ambient temperature at SPS 220-1 periodically, and provides the temperature values on path 314-1. Although not shown in the Figures, path 314-1 is connected as an input to phase controller 210. Phase controller 210 may receive the temperature values from time to time and take appropriate action in the event the temperature values exceed acceptable levels.

Gate driver 310 receives binary signal PWM-1, and in response to the logic level of PWM-1 generates the appropriate voltages on respective paths 312 and 313 to turn ON and turn OFF HS switch 320 and LS switch 330 in corresponding intervals indicated by PWM-1. HS switch 320 and LS switch 330 are each shown implemented as a MOSFET (Metal Oxide Semiconductor Field Effect Transistor) with gate driver 310 driving the gate terminals of the MOSFETs, although other implementations for the switches are possible.

In the example of FIG. 3, when PWM-1 is a logic high (corresponding to the first phase), gate driver 310 generates respective appropriate voltages on paths 312 (en-HS) and 313 (en-LS) to switch ON MOSFET 320 and switch OFF MOSFET 330. When PWM-1 is a logic low (corresponding to the second phase), gate driver 310 generates respective appropriate voltages on paths 312 and 313 to switch OFF MOSFET 320 and switch ON MOSFET 330. In an embodiment, both of transistors 320 and 330 are implemented as N-channel MOSFETs.

Current sensing block 350 operates to sense the inductor-current (IL) and thereby construct a (scaled/non-scaled) copy of the inductor-current in each of the first phases (HS phases) and second phases (LS phases). In FIG. 3, current sensing block 350 is shown as receiving the respective voltage drops across switches 320 and 330 to generate the copy. Current sensing block 350 provides the scaled/unscaled copy to phase controller 210 on path CS-1.

Phase controller 210 may make use of the copy of the inductor-current in operating one or more regulation feedback loop(s) controlled by phase controller 210 to provide a regulated voltage of a desired magnitude Vout as output 240. For example, phase controller 210 may operate a voltage-feedback loop, with Vout (240) being sensed and provided as feedback, and compare Vout with a reference voltage to generate a 'first comparison result'. Additionally, phase controller 210 may employ current-mode control and further compare the 'first comparison result' with a sawtooth voltage-ramp waveform whose slope is dependent on the inductor-current (IL). Phase controller 210 determines the slope based on the copy generated by current sensing block 350, and the slope may change from time to time depending on the inductor-current. Based on the result of the second comparison noted above, phase controller 210 generates PWMA-1 with appropriate pulse width to operate the high-side and low-side switches.

An example environment in which the TLVR of FIG. 2A and the SPSes therein may be deployed is a power supply module for servers. Such an environment may require the SPSes (and specifically SPS 220-1) to operate with a 'T-on' duration (first phase duration in which high-side switch is ON) of about 200 nano seconds (ns), with Vout being 1.8V. A TLVR architecture is used so to better handle fast and large load-transients. During steady-state operation, the currents in HS phases of the respective SPSes may generally be fairly similar to those in a non-TLVR-based multi-phase power supply. However, during load-transients the high-side switch ON interval of several or all phases in the TLVR may partly or substantially overlap causing large inductor-current slopes in the SPSes. If the phases are non-overlapping, the inductor current slope during the HS-phase is (Vin-Vout)/L. In case of emulation, the CS pin (e.g., CSA-1 (213-1) in FIG. 3) sends out a current ramp with a slope corresponding to this value. In a TLVR when some phases overlap, the inductor current slope increases and an emulated slope may not reflect the true inductor-current value. Therefore, emulation—in which no measurement or sensing of the inductor-current is employed, but instead an estimation of the inductor-current in one of the HS and LS phases is performed—may not be able to obtain an accurate copy of the inductor-current. Typically, phase controller 210 relies on proper HS phase (i.e., first phase) current information for its voltage-regulation feedback loop. Therefore, rather than emulation, it is generally preferable to sense/measure the current through the high-side switch in the first phases.

Several factors may introduce errors in the process of generation of the copy of the inductor-current (by current sense block 350). One factor is the unequal gains in the separate paths/circuits used to sense the voltage across the high-side switch and the low-side switch to obtain the magnitude of inductor-current in both phases. One set of blocks/circuits may be used to sense the voltage across the high-side switch and another set of blocks/circuits to sense the voltage across the low-side switch. Mismatch in the gains used by each of the two circuits or scaling factor/gain errors within either or both of the circuits can result in a copy that is not accurate.

Several aspects of the present disclosure are directed to minimizing or completely eliminating the mismatches and/or the gain/scaling factor errors noted above so as to generate an accurate copy of the inductor-current, and are described in detail next.

5. Accurate Sensing of Inductor-Current

Figure 4A:
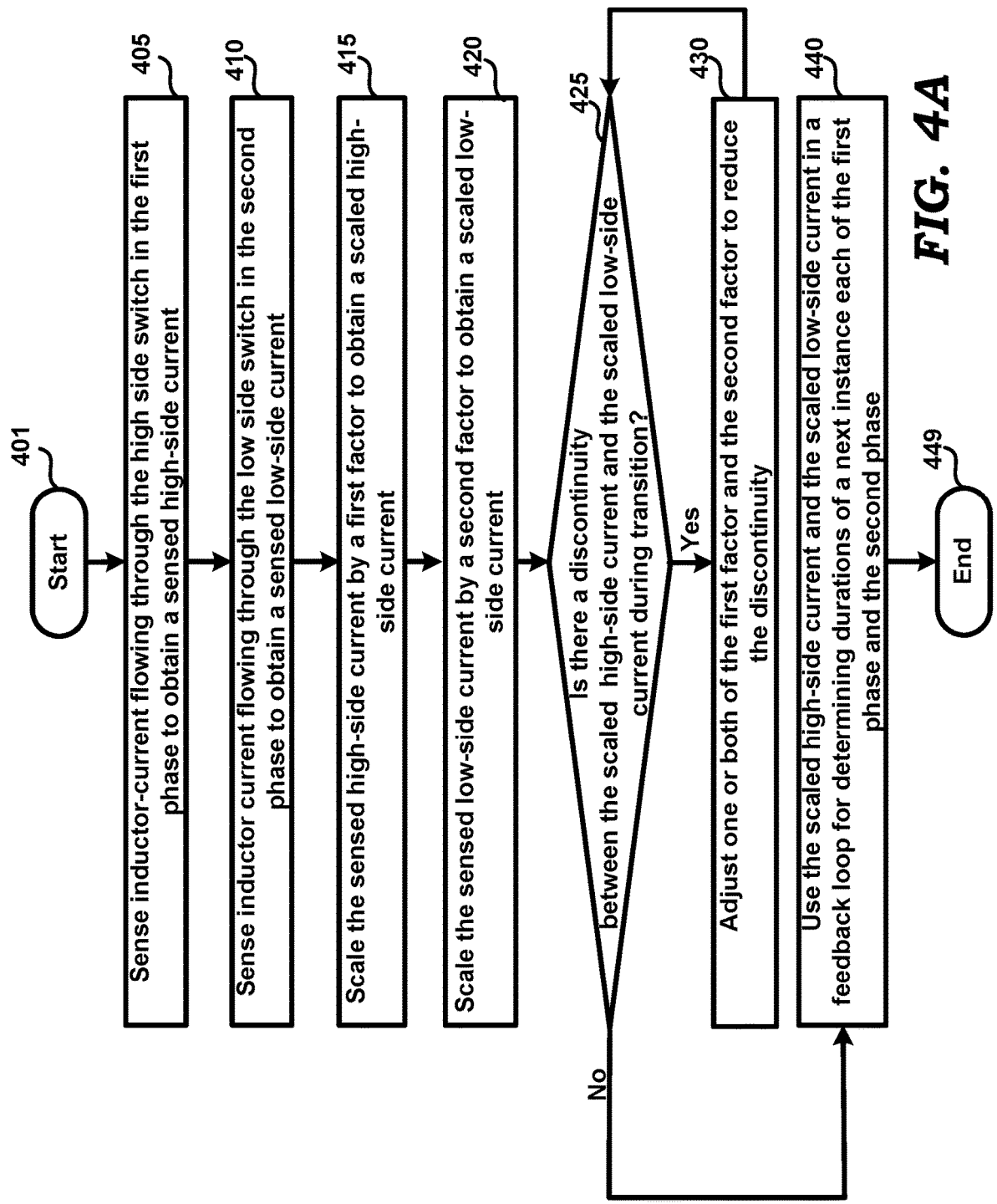
FIG. 4A is a flowchart illustrating the manner in which accurate sensing of the inductor-current is achieved as well as an example use of the copy of the inductor-current, in an embodiment of the present disclosure.

FIG. 4A is a flow chart illustrating the manner in which a copy of the inductor-current is generated with minimal or no inaccuracies/errors in an embodiment of the present disclosure. While the description is provided with specific examples and with respect to current sense block 350 of FIG. 3, the features of the present disclosure can be employed in the corresponding circuitry/sub-systems in other components and environments without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 401, in which control immediately passes to step 405.

In step 405, current sensing block 350 senses the inductor-current flowing through the high-side switch in the first phase to obtain a sensed high-side current. Control then passes to step 410.

In step 410, current sensing block 350 senses the inductor-current flowing through the low-side switch in the second phase to obtain a sensed low-side current. Control then passes to step 415.

In step 415, current sensing block 350 scales the sensed high-side current by a first factor to obtain a scaled high-side current. The first factor may be the gain of a suitable gain-setting block. Some or all of the scaling can be inherent to the sensing operation, as will be clear from the embodiments described below. Control then passes to step 420.

In step 420, current sensing block 350 scales the sensed low-side current by a second factor to obtain a scaled low-side current. The second factor may be the gain of another gain-setting block. Control then passes to step 425.

In step 425, current sensing block 350 examines both the scaled high-side current and the scaled low-side current for any discontinuity during transition from the first phase to the second phase between said scaled high-side current and scaled low-side current. A discontinuity is said to exist if the magnitudes of the scaled high-side current and scaled low-side current are unequal at/during the transition. If there is no discontinuity, control passes to step 440, otherwise control passes to step 430.

In step 430, current sensing block 350 adjusts one or both of the first factor and the second factor to reduce magnitude of the discontinuity between the scaled high-side current and the scaled low-side current during transition from said first phase to said second phase. Control then goes back to step 425, and the corresponding next steps are executed.

In step 440, current sensing block 350 forwards the final values (i.e., upon determining that there is no discontinuity between the two scaled currents) the scaled high-side current and scaled low-side current to phase controller 210 for use in a feedback loop for determining durations of a next instance of the first phase and the second phase. Control then passes to step 449, in which the flowchart ends.

By adjusting the gains of the two gain-setting blocks, any mismatch or scaling errors between the two circuits used to sense the high-side and low-side currents respectively are cancelled, or at least minimized. As a result, the constructed copy of the inductor-current is rendered free of such errors.

Although the flowchart is noted as ending in step 449, the operations of the steps may be repeated. In an embodiment of the present disclosure, the operations of the steps of the flowchart are continuous-time operations, and are continuously executed. However, in another embodiment of the present disclosure, the operations are discrete-time operations and are executed at discrete intervals, for example once every cycle of PWMA-1 (211).

Due to the accurate (undistorted) copy of the inductor-current thus obtained, the operations that employ the copy for other purposes such as for example in controlling the voltage regulation feedback loop of the switching converter or (SPS+Phase Controller) combination, current limiting, over-current protection, etc., are in turn also accurate and effective.

The implementation details of current sensing block 350 and the operation of the various internal blocks therein to generate an accurate copy of the inductor-current is described next in detail.

6. Current Sensing Block for Accurate Current Sensing

Figure 4B:
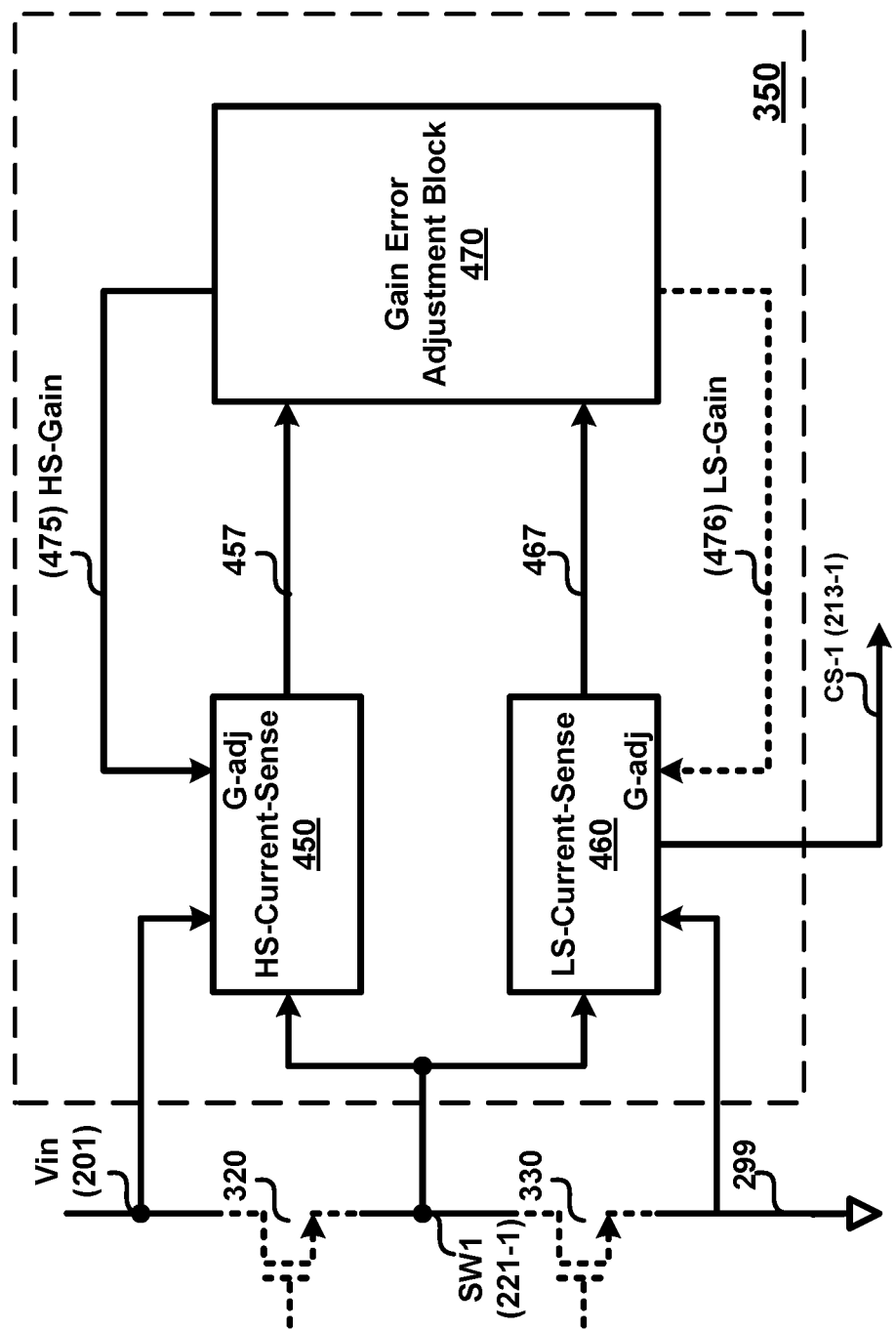
FIG. 4B is a block diagram illustrating the implementation of a current sensing block of an SPS, in an embodiment of the present disclosure.

FIG. 4B is a block diagram illustrating the implementation details of current sensing block 350 in an embodiment of the present disclosure. Current sensing block 350 is shown containing HS-Current-sense 450, LS-Current-sense 460 and Gain-Error-Adjustment-block 470. For clarity, HS switch 320 and LS switch 330 are also shown in FIG. 4B using dashed lines. In FIG. 4B, LS-current-sense 460 combines the high-side and low-side currents sensed respectively by blocks 450 and 460, and provides the combined combined-inductor-current copy on output CS-1. However, in other embodiments, such combining and providing of the sensed current may be performed by gain-error-adjustment-block 470.

It is first noted that although current sensing block 350 as shown in FIG. 4B and is described below as being capable of adjusting the gains of both HS-current-sense 450 and LS-current-sense 460 using gain-error-adjustment block 470 in closed-loop manner, it may be necessary to have one accurate gain (by trimming if necessary), and correct only the other gain using the closed-loop scheme so as to render the combined-inductor-current copy on CS-1 an accurate scaled reproduction of the actual inductor-current. In an embodiment, as described further below, the gain of LS-current-sense 460 is trimmed and assumed to be accurate and reliable, and gain-error-adjustment block 470 operates to adjust only the gain of HS-current-sense 450. Hence, the adjustment capability to LS-current-sense 460 is denoted by dashed lines. As is well known in the relevant arts, trimming refers to fine-tuning of parameters in a circuit. For example, laser-trimming may be used in which a laser is used to adjust the operating parameters of a circuit in the IC.

HS-Current-sense 450 receives the voltages at nodes Vin and SW1, and measures the voltage across these terminals in the first phases (HS switch is ON). HS-Current-sense 450 converts the measured voltage (which is equal to the inductor-current times the ON resistance of HS switch) into a corresponding current. The gain of the current thus generated is adjustable in a gain-setting block within HS-Current-sense 450 to generate a copy (HS-current-copy) which may be scaled or not) of the inductor-current during the first phases. HS-Current-sense 450 forwards the copy to Gain-Error-Adjustment-block 470 on path 457. The gain-adjust (G-adj) terminal receives an input to control the gain of the gain-setting block, and thereby adjust for mismatches or scaling errors within the sensing circuitry in HS-Current-sense 450.

LS-Current-sense 460 receives the voltages at nodes SW1 and ground (299), and measures the voltage across these terminals in the second phases (LS switch is ON). LS-Current-sense 460 converts the measured voltage (which is equal to the inductor-current times the ON resistance of LS switch) into a corresponding current. The gain of the current thus generated is adjustable in a gain-setting block within LS-Current-sense 460 to generate a copy (LS-current-copy) which may be scaled or not) of the inductor-current during the second phases. HS-Current-sense 450 forwards the copy to Gain-Error-Adjustment-block 470 on path 467. The gain-adjust (G-adj) terminal receives an input to control the gain of the gain-setting block, and thereby adjust for mismatches or scaling errors within the sensing circuitry in LS-Current-sense 460. LS-current-sense 460 is also shown in FIG. 4B as generating a combined copy of the sensed HS and LS current copies.

Gain-Error-Adjustment-block 470 receives HS-current-copy and LS-current-copy respectively from HS-Current-sense 450 and LS-Current-sense 460 and operates to identify discontinuity between the two waveforms of the copies at the end of the first phase and the beginning of the second phase. The end of the first phase and the beginning of the second phase can be coincident or slightly separated in time depending on several factors such as delays in the respective sensing circuits, etc. Generally, it is desirable that the two time-instances coincide, i.e., occur at the same time, as is well known in the relevant arts.

If Gain-Error-Adjustment-block 470 determines that a discontinuity is present (for example, as illustrated below with reference to FIG. 8), Gain-Error-Adjustment-block 470 adjusts the gain of either HS-Current-sense 450 (via path 475/HS-Gain) or LS-Current-sense 460 (via path 476/LS-Gain) or both to minimize the discontinuity. It is however noted here that there may be a specified limit to be maintained on overall absolute scaling gain of the combined-inductor-current copy on CS-1 with respect to the inductor-current. If both LS and HS sides are adjusted by block 470, then it is possible that the overall gain would exceed the specified limit. Accordingly, in an embodiment of the present disclosure, Gain-Error-Adjustment-block 470 adjusts only the gain of HS-Current-sense 450. In the embodiment, Gain-Error-Adjustment-block 470 adjusts HS-gain until the discontinuity is completely removed.

It is noted here that the specific manner in which HS-current-sense 450 and LS-current-sense 460 are noted above as sensing the inductor-current to generate HS-current-copy and LS-current-copy is provided merely as an example. As would be well-known to a skilled practitioner, other techniques and operations can also be used to sense the inductor-current and generate HS-current-copy and LS-current-copy. For example, a low-valued resistor can be placed in series with the inductor-current path(s), and the voltage-drop across the resistor can be measured, thereby yielding the magnitude of the inductor-current.

Further, the specific blocks 450, 460 and 470 are shown in FIG. 4B as being separate and noted above as performing specific operations on corresponding inputs and generating corresponding outputs. However, some of the operations can be split across the blocks differently also. For example, in an embodiment of the present disclosure described in detail below, HS-current-sense 450 does not directly provide the HS-current-copy to Gain-Error-Adjustment-block 470 on path 457, but instead generates a current which controls the LS-current-sense 460 during the first phase (HS phase). LS-current-sense 460, in response to the current (path not shown, but will be clear from the description below) generated by HS-current-sense 450 in turn generates the HS-current-copy and forwards it to Gain-Error-Adjustment-block 470 on path 467 itself.

The lower-level implementation details of HS-Current-sense 450, LS-Current-sense 460 and Gain-Error-Adjustment-block 470 as well as their operations is provided next in detail in an embodiment of the present disclosure.

7. HS-Current-sense Block

Figure 5:
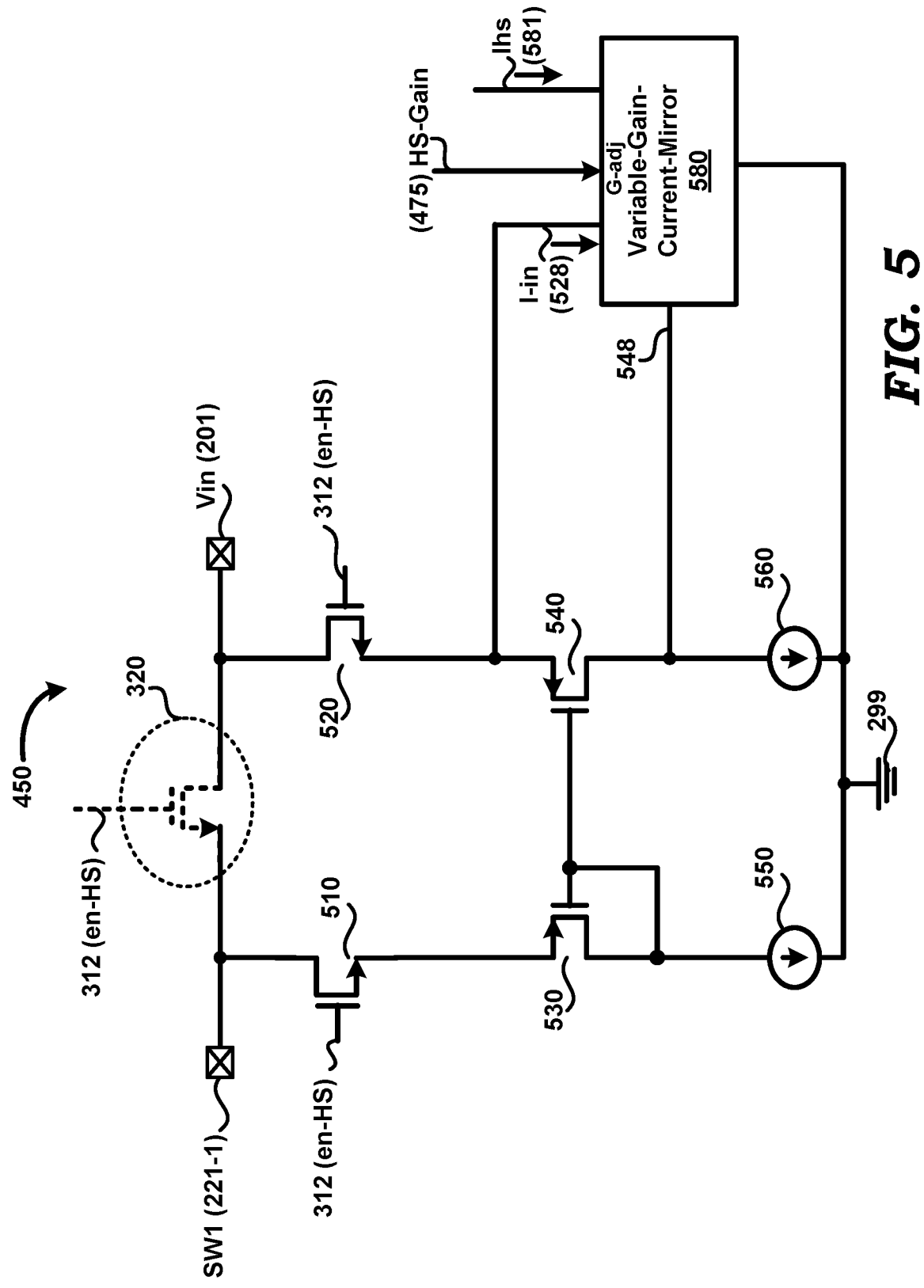
FIG. 5 is a diagram illustrating the implementation details of a high-side current-sensing circuit in an embodiment of the present disclosure.

FIG. 5 is a diagram illustrating the implementation details of HS-current-sense 450 in an embodiment of the present disclosure. HS-current-sense 450 is shown containing N-channel metal-oxide-semiconductor field effect transistor (NMOS) transistors 510 and 520, P-channel metal-oxide-semiconductor field effect transistor (PMOS) transistors 530 and 540, constant-current sinks 550 and 560 and variable-gain-current-mirror 580. High-side switch 320 is also shown in the Figure.

Transistors 320, 510 and 520 receive signal en-HS (312) on their respective gate terminals. During the first phases (in which en-HS is a logic HIGH), each of transistors 320, 510 and 520 is ON. When inductor-current flows through HS switch 320, a voltage-drop proportional to the magnitude of the inductor-current develops across transistor 320.

Transistors 530 and 540 form a current mirror-pair. A current determined by current-sink 550 flows in the series path formed by transistors 510 and 530 and sink 550. Similarly, a current determined by current-sink 560 flows in the series path formed by transistors 520 and 530 and sink 560. Transistors 510 and 520 may be matched transistors with similar characteristics. Transistors 530 and 540 may be matched transistors with similar characteristics. Current sinks 550 and 560 may be implemented to sink respective currents of the same value.

The voltage-drop across high-side switch 320 in an HS phase causes corresponding currents to flow through the respective series paths noted above. With current-sink value of sink 550 equal to that of sink 560, a current (I-in 528) proportional to the inductor-current flows into node 528 of variable-gain-current-mirror 580. The size of each of transistors 510 and 520 is selected to be several times smaller than that of transistor 320. In an embodiment, the ratio of the size/dimensions of transistor 320 to that of each of transistors 510 and 520 is between 500000:1 to 100000:1. As a result, copy I-in (528) of the inductor-current through HS switch 320 is correspondingly scaled down from (i.e., is smaller than) the inductor-current.

Variable-gain-current-mirror 580 represents a current-mirror circuit that receives I-in (528) as an input current, and generates an output current Ihs (581) that has a magnitude of M*I-In, wherein M is a gain factor that is determined (i.e., adjustable) by the gain-control signal HS-Gain received on path 475 to 'G-adj' terminal). Thus, Ihs (581, which can correspond to the copy on path 457 of FIG. 4) may be viewed as a 'scaled high-side current'. Variable-gain-current-mirror 580 can be implemented in a known way. Ihs (581) represents the inductor-current copy (HS-current-copy) during the HS phase (first phase).

8. LS-Current-Sense Block

Figures 6, 7:
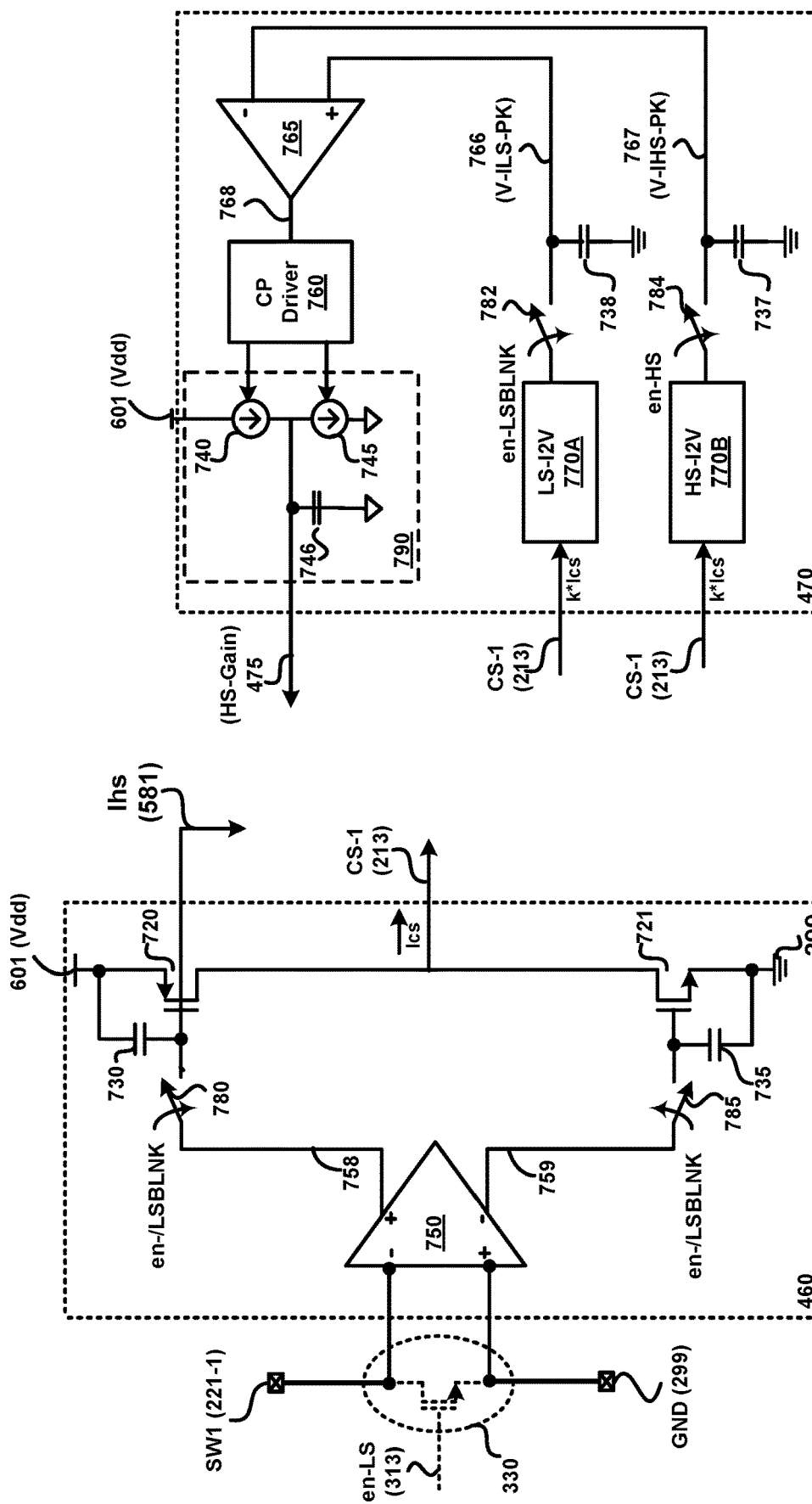
FIG. 6 is a diagram illustrating the implementation details of a low-side current-sensing circuit in an embodiment of the present disclosure.
FIG. 7 is a block diagram illustrating the implementation details of a gain-error-adjustment block in an embodiment of the present disclosure.

FIG. 6 is a diagram of LS-current-sense 460 in an embodiment of the present disclosure. LS-current-sense 460 measures (or senses) the inductor-current in the second phases to provide a copy of the inductor-current (LS-current-copy) as an output on node 213 (CS-1). Additionally, LS-current-sense 460 also operates in the first phase to create a final copy of the inductor-current (final-HS-current-copy) based on the output Ihs of HS-current-sense 450 as described above. LS-current-sense 460 also provides the final-HS-current-copy on path 213 (CS-1). The operation of LS-current-sense 460 in generating LS-current-copy is described next.

LS-current-sense 460 is shown containing amplifier 750, switches 780 and 785, and capacitors 730 and 735, and PMOS 720 and NMOS 721. The series connection of transistors 720 and 721 is connected across supply node 601 (Vdd) and ground 299. For clarity, LS switch 330 is also shown. Ihs (581) is connected to the gate of PMOS 720.

Amplifier 750 receives the voltage across LS switch 330 in the second phases (en-LS is being a logic HIGH in the second phases). Amplifier 750 employs feedback (not shown in the interest of conciseness) and generates the gate voltages for transistors 720 and 721 such that Ics (on node CS-1) reflects the current in the inductor. Amplifier 750 is shown as a fully differential amplifier merely as an example. Other amplifier types and topologies can also be used instead. In an embodiment, amplifier 750 is a fully differential amplifier with gain determined by a feedback network (not shown, but for examples using two pairs of resistors as is well known in the art) that would be used to operate amplifier 750 in closed-loop mode. In the embodiment, fully differential amplifier 750 receives the voltage across LS switch 330 across the (−) input terminal connected to path 335 and the (+) input terminal connected to ground 299. Fully differential amplifier 750 provides a corresponding amplified difference as output voltage across terminals 758 (+) and 759 (−).

The inductor-current during LS phase generates a voltage across LS switch 330 whose magnitude is a product of the inductor-current and the ON-resistance of LS switch 330. For example, if the LS switch has a 2.5 milli Ohm ON-resistance and is passing an inductor-current of 40 A, then the voltage across LS switch 330 will be 100 mV. As with HS-current-sense 450 described above, sensing the voltage across LS switch 330 is a lossless method of sensing the current. However, other techniques for obtaining a measure of the magnitude of inductor-current in the second phases can also be used, as would be apparent to one skilled in the arts upon reading this disclosure.

The operation of LS-current-sense 460 in the second phase is now described.

(A) Second Phase:

In operation, LS switch 330 is switched ON by control input en-LS (313) at the start of the second phase. In the second phase since I-in (528) would be floating, Ihs (581) would also be floating and does not affect the operation of LS-current-sense 460.

Control signals en-/LSBLNK and en-LSBLNK may be binary signals. Control signal en-/LSBLNK is active (asserted to be logic HIGH in the example) for all durations except blanking intervals. Control signal en-LSBLNK is active (asserted to be logic HIGH in the example) in blanking intervals only. Control signals en-/LSBLNK and en-LSBLNK may generated by a control circuit (not shown), but which may be contained in SPS-1. The generation of such control signals and the circuitry for such generation can be done in a known way. Control signal en-/LSBLNK is the logical inverse of en-LSBLNK.

It is noted here that a blanking interval (T-LSBLNK—illustrated in FIG. 8) represents an interval between each first phase and the immediately following second phase of each PWM switching cycle. In each T-LSBLNK interval amplifier 750 is ON (staring from, the start of T-LSBLNK), but whose outputs are not yet settled and correctly reflecting the input. This occurs due to the bandwidth (BW) of differential amplifier 750 being finite. Therefore, amplifier 750 may need some time from being switched ON (e.g., at the start of a second phase) till it reaches steady-state operation and generates outputs correctly. The duration of T-LSBLNK may be set by a designer/user based on the band-width (BW) of differential amplifier 450. Output on CS-1 is held constant (at the last value of HS current sensed immediately previously—as shown in interval T_Blank in FIG. 8 described below) for the duration of T-LSBLNK. Control signal en-/LSBLNK causes each of switches 780 and 785 to be closed at the end of the blanking phase, and to be opened at the end of the corresponding second phase, the switches remaining closed for the duration from the end of the blanking phase to the end of the corresponding second phase.

Therefore, in the second phase, voltages on nodes 758 and 759 respectively cause transistors 720 and 721 to respectively source and sink respective currents based on the specific magnitudes of voltages 758 and 759 and therefore the input voltage to the amplifier. Thus, LS-current-sense 460 effectively operates as a voltage to current converter. As a result, a difference current (denoted by Ics) between the current sourced by transistor 720 and the current sunk by transistor 721 is provided on path 213 (CS-1). The difference current is the inductor-current copy LS-current-copy, which may be a scaled copy, with the magnitude of scaling is a fraction determined by the design details of LS-current-sense 460. Thus, path 213 provides a 'scaled low-side current' generated by LS-current-sense 450.

Figure 8:
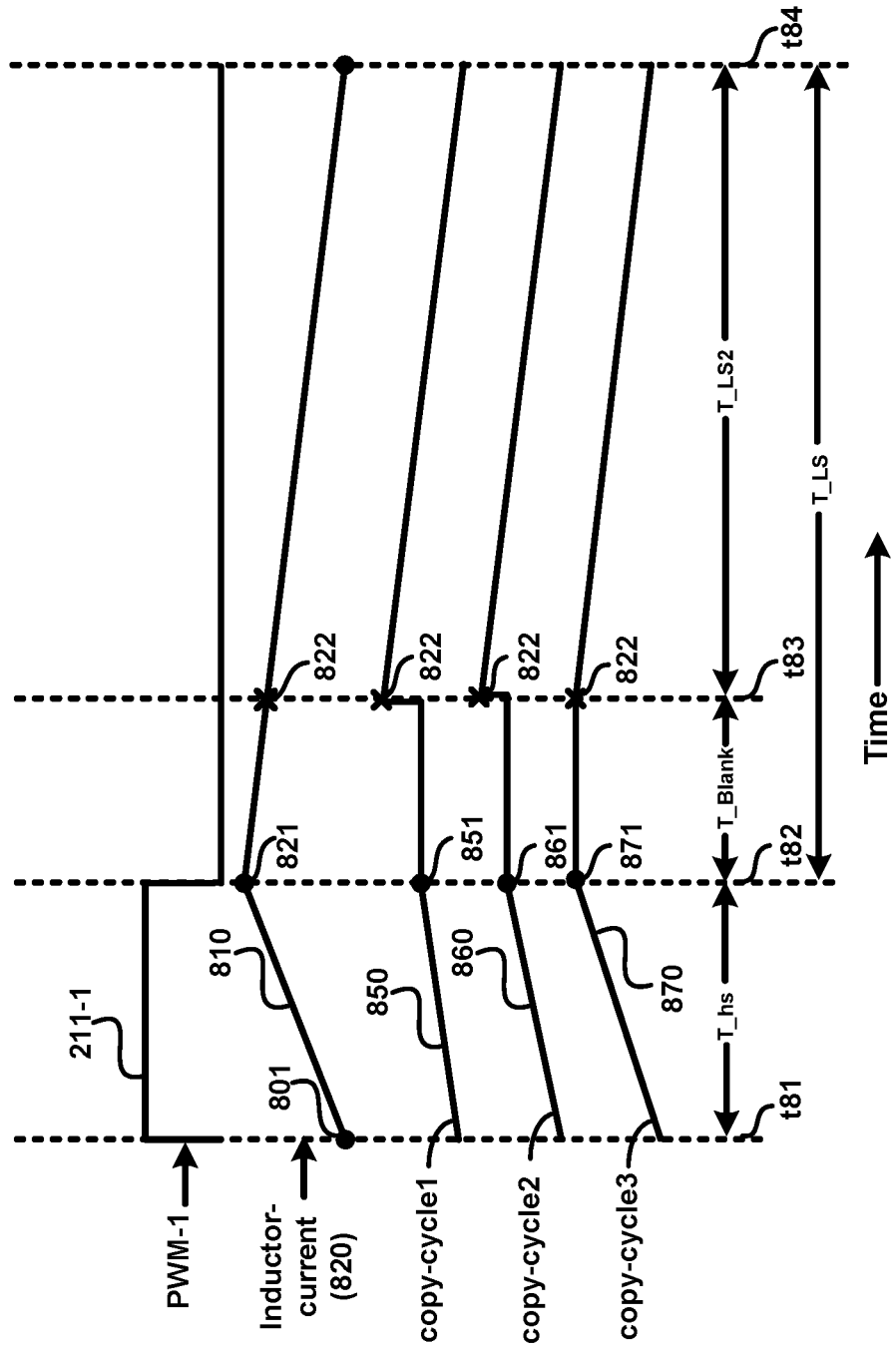
FIG. 8 is a timing diagram illustrating the operation of a gain-error-adjustment block in an embodiment of the present disclosure.

Additionally, capacitors 730 and 735 would charge/discharge depending on voltages on path 758 and 759 respectively, and at the end of the second phase would each have a voltage across them representative of (or corresponding to) the magnitude of the LS-current-copy on path 213 at the end of the second phase. In other words, capacitors 730 and 735 store (or hold) the 'information' (in the two voltages) representative of the LS-current-copy magnitude at the end of the second phase (as illustrated in FIG. 8 at time t84). Such 'valley hold' capability of LS-current-sense 460 is required since the immediately following first phase, and the generation of the corresponding HS-current-copy by LS-current-sense 460 based on Ihs (581) needs such information for its start point.

The operation of LS-current-sense 460 in the first phase to generate the final-HS-current copy on path 213 is briefly described next.

(B) First Phase:

In the first phase, assuming HS-Gain (475 of FIG. 6) is maintained constant at a desired voltage, HS-current-copy Ihs (581) would affect the voltage at the gate terminals of transistor 720 in proportional to the magnitude of Ihs (581). Ihs is a scaled copy of the inductor-current in the HS phase. Thus, Ihs would have the general pattern (waveform) of the inductor-current in the HS phase, although the magnitude would be scaled-down. Thus, in the HS phase, the voltage at the gate terminal of transistor 720 correspondingly varies. Therefore, the difference-current at node 213 (CS-1) is a current that is a scaled-version of I-in (528), with the degree of scaling depending on the voltage HS-gain (475) (FIGS. 5 and 7). HS-gain (475) is the adjustment-voltage generated by Gain-error-adjustment block 470, which is described above, and is also further described below with reference to FIG. 7. The difference-current Ics on path 213 in the HS phase is referred to herein as final-HS-current-copy. The combination of the final-HS-current-copy in the HS phase and the LS-current-copy in the immediately-following LS phase is the combined-inductor-current-copy for the PWM switching cycle (one period of PWM-1 of FIGS. 2A, 2B and 3).

As also noted above, a blanking interval may be introduced between the HS phase and the LS phase of each PWM switching cycle. In a blanking interval of a PWM switching cycle the magnitude of the combined-inductor-current copy on path 213 is maintained at the same level as that at the end of the HS phase.

It may be appreciated that the 'gains/attenuations' or scaling factors of HS-current-sense 450 and LS-current-sense 460 may not be equal. In other words, due to factors such as manufacturing variability, operating temperature, process variations, etc., can result in different gains of HS-current-sense 450 and LS-current-sense 460 even if they are designed to be equal. For example, a gain error of up to 10% of the actual gains can result.

Referring to FIG. 5, a major portion of the gain of HS-current-sense 450 may be due to the large size-difference between transistor 320 and each of transistors 510 and 520. As noted above, the scaling-down factor of the sizes may be in the range 500000:1 to 100000:1. Such a large scaling factor may not be precisely obtained during fabrication due to manufacturing errors, process variations, etc.

Similarly, referring to LS-current-sense 460 of FIG. 6, the gain or scaling there may deviate from what it is designed to be due to some of the same factors noted above. As a result, there may be a discontinuity between the end of the HS-current-copy portion (as well as the final-HS-current-copy portion generated by LS-current-sense 460 as described below) and the start of the LS-current-copy portion of the combined-inductor-current copy (HS-current-copy plus LS-current-copy).

An example is indicated by the difference in magnitudes of the combined-inductor-current copy (copy1) at points 861 and 822 in FIG. 8, described further below. In other words, assuming that waveform IL-2 of FIG. 2B represents the combined-inductor-current copy (rather than the actual inductor-current), there may be discontinuities in the waveform of IL-2 at times t21, t23 and t25 (blanking intervals are not shown in FIG. 2B).

It is noted here that it may be possible to 'trim' the gains of HS-current-sense 450 and LS-current-sense 460 to make them equal at the time of circuit/IC testing post-fabrication of SPS-1. Even if such trimming were to sufficiently precise, there would still remain some difference between the two gains due to operating temperature, manufacturing error margins/variations, etc.

Accordingly, in embodiment of the present disclosure, the gain of LS-current-sense 460 is trimmed at the time of post-fabrication circuit/IC testing of SPS-1 (e.g., using automated test equipment/ATE as is well known in the relevant arts). Hence, the gain of LS-current-sense 460 is made very accurate, i.e., equal to what the gain was designed for. The gain of HS-current-sense 450 is, however, adjusted using a closed-loop scheme instead of being trimmed once at the time of post-fabrication testing.

Such a closed-loop scheme is illustrated in FIG. 4B and described above. In FIG. 4B, gain-error-adjustment block 470 is noted as receiving HS-current copy and LS-current copy and capable of 'trimming' the gains of both HS-current-sense 450 and LS-current-sense 460. However, it may be necessary to have one accurate gain (by trimming if necessary), and correct only the other gain using the closed-loop scheme so as to render the combined-inductor-current copy an accurate scaled reproduction of the actual inductor-current.

The circuits/blocks of FIGS. 5, 6, 7 and 8 represent the closed-loop scheme in an embodiment of the present disclosure in which only the gain of LS-current-sense 460 is trimmed, with the closed-loop scheme designed to equalize the gain of HS-current-sense 450 (without requiring trimming) and the trimmed-gain of LS-current-sense 460. The closed-loop may be designed to be operative continuously during the entire operation of SPS-1 (i.e., from power-ON/RESET to power-OFF/RESET), to be operative only once (for e.g., at RESET or POWER-ON of SPS-1) or only at desired time intervals during the operation of SPS-1.

In an embodiment of the present disclosure, the closed-loop scheme is always operational to maintain the gain of HS-current-sense 450 equal to the trimmed-and-accurate gain of LS-current-sense 460. It is noted here that the opposite solution can also be employed in other embodiments in a similar way as described herein. That is, only the gain of HS-current-sense 450 can be trimmed, with a corresponding similar closed-loop scheme designed to adjust the gain of LS-current-sense 460 (without requiring trimming) to equal the trimmed (and accurate) gain of HS-current-sense 450.

The internal details of gain-error-adjustment block 470 and its operation to equalize the gain of HS-current-sense 450 with the trimmed-and-accurate gain of LS-current-sense 460 are described next.

9. Gain-Error-Adjustment-Block and Closed-Loop Scheme

FIG. 7 is a block diagram illustrating the implementation details of gain-error-adjustment block 470 in an embodiment of the present disclosure. Gain-Error-Adjustment-block 470 is shown containing low-side current-to-voltage (LS-I2V) converter 770A and high-side current-to-voltage (HS-I2V) converter 770B, switches 782 and 784, capacitors 737 and 738, comparator 765, up/down (UP/DN) charge pump driver (CP driver) 760 and charge pump 790. Charge pump 790 is in turn shown containing current source 740 and current sink 745, and capacitor 746.

LS-I2V converter 770A receives the combined-inductor-current copy on path CS-1 (213), further scales the combined-inductor-current copy by a factor k (k typically being, but not necessarily, less than 1), and converts the scaled combined-inductor-current copy to a corresponding voltage provided as an output on the node connected to one end of switch 782.

HS-I2V converter 770B receives the combined-inductor-current copy on path CS-1 (213), further scales the combined-inductor-current copy by the factor k, and converts the scaled combined-inductor-current copy to a corresponding voltage provided as an output on the node connected to one end of switch 784.

A scaling circuit (not shown) to scale the combined-inductor-current copy by the factor k can be implemented in a known way.

Switch 784 is controlled by control signal en-HS. Control signal en-HS has a logic value that causes switch 784 to be closed for the duration of the first phase, and open otherwise. Switch 782 is controlled by control signal en-LSBLNK. Control signal en-LSBLNK has a logic value that causes switch 782 to be closed for the duration of the blanking interval (noted above, and further illustrated below with reference to FIG. 8), and open otherwise.

The operation of switch 782 charges capacitor 738 to a voltage V-ILS-PK (766) representing the peak value of the combined-inductor-current copy at the end of each blanking interval (which is the also the beginning of a next LS phase). The operation of switch 784 charges capacitor 737 to a voltage V-IHS-PK (767) representing the value of combined-inductor-current copy at the end of each HS phase.

Comparator 765 is coupled to each of paths 766 (at the + terminal) and 767 (at the − terminal), and generates an output on path 768 that is of one polarity (e.g., positive) if V-ILS-PK is greater than V-IHS-PK, and of the opposite polarity (e.g., negative) if V-ILS-PK is less than V-IHS-PK. Thus, the logic level of the output of comparator 765 is either HIGH or LOW.

UP/DN CP driver 760 represents a charge pump driver. The combination of current source 740, current sink 745 and capacitor 746 represents a charge pump (CP). UP/DN CP driver 760 activates current source 740 if the present output of comparator 765 on path 768 is a logic HIGH, and activates current sink 745 if the present output of comparator 765 on path 768 is a logic LOW. UP/DN CP driver 760 operates, based on input 768 to charge or discharge capacitor 746. Only one of 740 and 745 is ON in a given time interval.

In operation, Gain-Error-Adjustment block 470 operates iteratively to minimize or eliminate the discontinuity (noted above) and thereby enable SPS-1 to obtain an accurate copy of the inductor-current. FIG. 8 is an example timing diagram illustrating the operation of Gain-Error-Adjustment block 470. In addition to signal PWM-1, waveforms of inductor-current (820) and the final-inductor-current copy in three successive iterations also shown. T_hs, T_Blank and T_LS2 respectively represent the durations of the first phase, blanking interval and the second phase of a switching cycle. Three successive switching cycles are shown in the three respective iterations. The 'time' dimension is marked as being along the horizontal/X axis. However, for clarity, the three copies of final-inductor-current, namely copy-cycle1, copy-cycle2 and copy-cycle3, in three respective iterations are 'superimposed' on each other along the 'time' axis but separated in the vertical/Y-axis. Thus, cycle2 immediately follows cycle1 and cycle3 immediately follows cycle2.

Each of the first phases of the three cycles (cycle1, cycle2 and cycle3) starts with the inductor-current copy equal to the valley current at the end of the immediately previous second phase (of the immediately previous cycle) due to the operation of the 'valley hold' mechanism described above. The inductor-current (820) is assumed to be identical in each of the three iterations. Point 801 at t81 is the starting value (valley current magnitude) of the inductor-current in the first phase and equals the end value at the end of the corresponding second phase. Points 821 at t82 and 822 at t83 respectively represent the magnitude of the inductor-current at the end of the first phase and the beginning of the second phase. The duration of the blanking interval is exaggerated in FIG. 8, and would be small enough the magnitude 821 is very nearly equal to magnitude 822. Line 810 represents the slope of the inductor-current waveform in the first phase. It is assumed in FIG. 8 and the description below that the inductor-current waveform has reach steady-state.

The operation of the loop is now illustrated with combined reference to FIGS. 7 and 8.

In the first cycle (cycle1), HS-gain (475) is assumed to be set (initialized) to a value slightly less than the target gain. 'Target gain' is the magnitude of HS-gain when discontinuity has been completely removed). It is noted here that the closed-loop scheme may be designed for a certain range of gain-correction based on worst-case mismatch between HS and LS sensing gains. For example, if the worst-case mismatch is 20%, initial HS-gain may be set to −20% (i.e., 20% below the target gain) and the correction range designed to be able to adjust the gain up to +20%.

Slope 850 and the difference in magnitudes between points 861 and 822 correspond to the initial value of HS-gain. Each copy of the inductor-current in the LS-phase (T_LS) is assumed to be accurate (as noted above).

In the first iteration, since the magnitude represented by point 851 is less than that represented by point 822, comparator 765 causes driver 760 to switch ON current source 740 (UP operation) for a pre-determined duration, thereby charging capacitor 746. Current sink 745 is OFF for the duration. As a result, capacitor 746 charges to a corresponding voltage, which is the value of HS-gain for the second iteration.

In the second iteration, the slope 860 of the inductor-current copy is greater than that (850) in the first iteration. However, since the magnitude represented by point 861 is still less than that represented by point 822, comparator 765 causes driver 760 to switch ON current source 740 (UP operation) for the pre-determined duration, thereby further charging capacitor 746. Current sink 745 is OFF for the duration. As a result, capacitor 746 further charges to a corresponding (larger) voltage, which is the value of HS-gain for the third iteration.

In the third iteration, the slope 870 of the inductor-current copy is greater than that (860) in the first iteration. The magnitude represented by point 871 is equal to that represented by 822 and since the discontinuity has been completely removed. Thereafter, HS-gain will toggle alternately around (i.e., above and below) point 871 in each cycle based on the charge pump ripple, until the inductor-current waveform changes due to changes in the load current (current drawn from Vout).

It is noted here that if amplifier 750 has a sufficiently high BW, then duration T_Blank could be smaller or zero. When duration T-Blank equals zero, points 871 and 822 are the same.

10. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2A, 3, 4B, 5, 6 and 7, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the NMOS transistors may be replaced with PMOS (P-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of sensing inductor-current flowing through an inductor driven by a combination of a high-side switch and a low-side switch in a switching converter, wherein the high-side switch and the low-side switch respectively drive the inductor in a first phase and a second phase periodically, the method performed in the switching converter, the method comprising:
    sensing said inductor-current flowing through said high-side switch with a first scaling factor in said first phase to obtain a scaled high-side current;
    sensing said inductor-current flowing through said low-side switch with a second scaling factor in said second phase to obtain a scaled low-side current;
    examining both of said scaled high-side current and said scaled low-side current for any discontinuity between said scaled high-side current and scaled low-side current during transition from said first phase to said second phase; and
    in case of discontinuity, adjusting one or both of said first factor and said second factor to reduce magnitude of the discontinuity between said scaled high-side current and said scaled low-side current during transition from said first phase to said second phase.

2. The method of claim 1, wherein said scaled high-side current and said scaled low-side current are used in a feedback loop for determining durations of a next instance each of said first phase and said second phase.

3. The method of claim 1, wherein said adjusting adjusts only said first factor, and wherein said second factor is fixed by trimming.

4. The method of claim 3, wherein adjusting said first factor comprises adjusting a current-gain of a variable-gain current mirror of a circuit used for said sensing said inductor-current flowing through said high-side switch.

5. A power stage of a switching converter, said switching converter to generate a regulated voltage at an output node, said power stage comprising:
    a high-side switch and a low-side switch to respectively drive a first inductor in a first phase and a second phase periodically based on an input control signal received from an external component, wherein one terminal of said first inductor is coupled to a junction of said high-side switch and said low-side switch, and wherein the other terminal of said inductor is coupled to said output node; and
    a current sensing block to generate a copy of the inductor-current through said inductor in each of said first phase and said second phase,
    wherein said current sensing block comprises:
    a high-side sensing block to sense said inductor-current flowing through said high-side switch with a first scaling factor in said first phase to obtain a scaled high-side current;
    a low-side sensing block to sense said inductor-current flowing through said low-side switch with a second scaling factor in said second phase to obtain a scaled low-side current;
    a gain-adjustment block coupled to receive each of said scaled high-side current and scaled low-side current, said gain-adjustment block to examine both of said scaled high-side current and said scaled low-side current for any discontinuity between said scaled high-side current and scaled low-side current during transition from said first phase to said second phase,
    wherein, in case of discontinuity, said gain-adjustment block adjusts one or both of said first factor and said second factor to reduce the magnitude of discontinuity.

6. The power stage of claim 5, wherein said gain-adjustment block adjusts only said first factor, wherein said second factor is fixed by trimming a corresponding portion of said low-side sensing block.

7. The power stage of claim 6, wherein said high-side sensing block is designed to forward said scaled high-side current to said low-side sensing block,
    wherein said low-side sensing block is designed to forward a combined current comprising said scaled high-side current and said scaled low-side current to said gain adjustment block.

8. The power stage of claim 7, wherein said high-side sensing block is coupled to receive a first voltage across said high-side switch, said first voltage being representative of said inductor-current flowing through said high-side switch in said first phase,
    wherein said high-side sensing block is designed to convert said first voltage to a corresponding first current, said high-side sensing block further comprising a variable-gain current mirror, wherein said variable-gain current mirror is designed to receive a current-gain factor, said variable-gain current mirror to scale said first current by said current-gain factor to generate said scaled high-side current, wherein said gain-adjustment block is designed to generate said current-gain factor to adjust said first factor.

9. The power stage of claim 8, wherein said first factor is a product of said current-gain factor and a fixed gain factor, said high-side current mirror further comprising a pair of transistors and a second current mirror, wherein a portion of said fixed gain factor is the ratio of the size of said high-side switch and either of the sizes of a pair of transistors in said high-side current sensing block, said high-side sensing block further comprising a second current mirror, wherein a combination of said pair of transistors and said second current mirror operate to convert said first voltage to a corresponding first current.

10. The power stage of claim 9, further comprising a gate driver coupled to receive said input control signal and to generate a high-side switch control signal and a low-side switch control signal to respectively control switching of said high-side switch and said low-side switch, wherein a first current terminal of a first transistor of said pair of transistors is coupled to a first current-terminal of said high-side switch, wherein a second current terminal of a second transistor of said pair of transistors is coupled to a second current-terminal of said high-side switch, wherein a control terminal of each of said high-side switch, said first transistor and said second transistor is coupled to said high-side switch control signal, wherein a second current terminal of each of said first transistor and said second transistor is respectively coupled to respective current sinks of said second current mirror.

11. The power stage of claim 9, wherein said gain-adjustment block is designed to iteratively estimate, based on said scaled high-side current and said scaled low-side current, a peak of said inductor-current at a transition from said first phase to said second phase, wherein said gain-adjustment block is designed to compare a magnitude of said scaled high-side current at said transition in a first period of said input control signal with a magnitude of said scaled low-side current at said transition in said first period, said gain-adjustment block to change said first scaling factor for a next period of said input control signal based on a result of said comparison, wherein said gain-adjustment block is designed to perform said comparison and said changing until said magnitude of said scaled high-side current at said transition equals said magnitude of said scaled low-side current at said transition.

12. The power stage of claim 11, wherein gain-adjustment block comprises:

a comparator to perform said comparison to generate said result; and a charge pump coupled to receive said result and to perform said changing based on said result.

13. The power stage of claim 12, said scaled high-side current and said scaled low-side current together comprise said copy of said inductor-current, wherein said low-side sensing block comprises:

a third transistor and a fourth transistor coupled in series between a first constant reference potential and a second constant reference potential, wherein said copy of said inductor-current is provided at a current-sense output terminal located at a junction of said third transistor and said fourth transistor, an amplifier to amplify a voltage across said low-side switch in said second phase and to provide an amplified voltage across a pair of terminals;

a first capacitor and a second capacitor;

a first switch coupled to a first terminal in the pair of terminals, and operable to be closed for a duration corresponding to an interval from the end of a blanking phase of said second phase to the end of said second phase to charge said first capacitor;

a second switch coupled to a second terminal in the pair of terminals, and operable to be also closed for a duration corresponding to an interval from the end of said blanking phase of said second phase to the end of said second phase to charge said second capacitor, wherein a first current terminal of said third transistor is coupled to said first constant reference potential, wherein a second current terminal of said third transistor is coupled to said current-sense output terminal, wherein a control terminal of said third transistor is coupled to each of a corresponding terminal of said first switch and a corresponding terminal of said first capacitor, said control terminal of said third transistor being also coupled to receive said scaled high-side current, wherein a first current terminal of said fourth transistor is coupled to said second constant reference potential, wherein a second current terminal of said fourth transistor is coupled to said current sense output terminal, wherein a control terminal of said fourth transistor is coupled to each of another corresponding terminal of said second switch and said second capacitor, wherein said first capacitor is coupled between said first constant reference potential and said control terminal of said third transistor, and wherein said second capacitor is coupled between said second constant reference potential and said control terminal of said fourth transistor.

14. The power stage of claim 13, wherein said gain-adjustment block further comprises:

a low-side current-to-voltage (LS-I2V) converter to convert a scaled version of the current at said current-sense output terminal to a corresponding first voltage provided at an output terminal of said LS-I2V converter;

a high-side current-to-voltage (HS-I2V) converter to convert a scaled version of the current at said current sense output terminal to a corresponding second voltage provided at an output terminal of said HS-I2V converter; and a third capacitor and a fourth capacitor, wherein said third capacitor is coupled to and output terminal of said LS-I2V converter for a duration of said blanking interval of said second phase, wherein said fourth capacitor is coupled to an output terminal of said HS-I2V converter for a duration of said first phase, wherein said comparator is coupled to each of said output terminals of said LS-I2V converter and said HS-I2V converter to compare respective voltages across said third capacitor and said fourth capacitor to generate said result, wherein an output of said charge pump provides said current-gain factor.

15. A voltage regulator module (VRM) comprising:
a phase controller to generate a regulated supply voltage on a first supply node;
an inductor having a first terminal coupled to said first supply node; and
a power stage comprising:
  a high-side switch and a low-side switch to respectively drive said inductor in a first phase and a second phase periodically based on an input control signal received from said phase controller, wherein a second terminal of said inductor is coupled to a junction of said high-side switch and said low-side switch; and
  a current sensing block to generate a copy of the inductor-current through said inductor in each of said first phase and said second phase,
  wherein said current sensing block comprises:
    a high-side sensing block to sense said inductor-current flowing through said high-side switch with a first scaling factor in said first phase to obtain a scaled high-side current;
    a low-side sensing block to sense said inductor-current flowing through said low-side switch with a second scaling factor in said second phase to obtain a scaled low-side current;
    a gain-adjustment block coupled to receive each of said scaled high-side current said gain-adjustment block to examine both of said scaled high-side current and said scaled low-side current for any discontinuity between said scaled high-side current and scaled low-side current during transition from said first phase to said second phase,
    wherein, in case of discontinuity, said gain-adjustment block adjusts one or both of said first factor and said second factor to reduce the magnitude of discontinuity.

16. The VRM of claim 15, wherein said gain-adjustment block adjusts only said first factor, wherein said second factor is fixed by trimming a corresponding portion of said low-side sensing block.

17. The VRM of claim 16, wherein said high-side sensing block is designed to forward said scaled high-side current to said low-side sensing block,
  wherein said low-side sensing block is designed to forward a combined current comprising said scaled high-side current and said scaled low-side current to said gain adjustment block.

18. The VRM of claim 17, wherein said high-side sensing block is coupled to receive a first voltage across said high-side switch, said first voltage being representative of said inductor-current flowing through said high-side switch in said first phase,
  wherein said high-side sensing block is designed to convert said first voltage to a corresponding first current, said high-side sensing block further comprising a variable-gain current mirror,
  wherein said variable-gain current mirror is designed to receive a current-gain factor, said variable-gain current mirror to scale said first current by said current-gain factor to generate said scaled high-side current,
  wherein said gain-adjustment block is designed to generate said current-gain factor to adjust said first factor.

19. The VRM of claim 18, wherein said first factor is a product of said current-gain factor and a fixed gain factor, said high-side current mirror further comprising a pair of transistors and a second current mirror,
  wherein a portion of said fixed gain factor is the ratio of the size of said high-side switch and either of the sizes of a pair of transistors in said high-side current sensing block,
  said high-side sensing block further comprising a second current mirror, wherein a combination of said pair of transistors and said second current mirror operate to convert said first voltage to a corresponding first current.

20. The VRM of claim 19, further comprising a gate driver coupled to receive said input control signal and to generate a high-side switch control signal and a low-side switch control signal to respectively control switching of said high-side switch and said low-side switch,
  wherein a first current terminal of a first transistor of said pair of transistors is coupled to a first current-terminal of said high-side switch,
  wherein a second current terminal of a second transistor of said pair of transistors is coupled to a second current-terminal of said high-side switch,
  wherein a control terminal of each of said high-side switch, said first transistor and said second transistor is coupled to said high-side switch control signal,
  wherein a second current terminal of each of said first transistor and said second transistor is respectively coupled to respective current sinks of said second current mirror.

* * * * *